Patented Oct. 27, 1936

2,058,725

UNITED STATES PATENT OFFICE 2,058,725

BACKING OF PHOTOGRAPHIC MATERIALS TO PREVENT HALATION

Wilhelm Schneider, Dessau in Anhalt, Germany, assignor to Agfa Ansco Corporation, Binghamton, N. Y., a corporation of New York No Drawing. Application February 11, 1933, Serial No. 656,358. In Germany February 24, 1932

5 Claims. (Cl. 95—8)

My present invention relates to the photographic art and more particularly to a new backing of photographic materials to prevent halation.

In the application Ser. No. 505,977, matured into Patent 1,845,404 filed by Hermann Dürr and myself there is described an anti-halation layer comprising a dye or a mixture of dyes being the condensation product of a substituted aromatic aldehyde with a quaternary heterocyclic base carrying a methyl group capable of reaction, said dyes being completely destroyed in the developing and fixing baths.

It is an object of this invention to provide an improved layer of this kind. Further objects will be seen from the detailed specification following hereafter.

I have found particularly suitable for the manufacture of anti-halation layers, the dyes resulting from condensation of substituted aromatic halides and quaternary ammonium bases containing a methyl group capable of reacting, and containing an atom grouping which imparts to the dye a substantive character towards the material of the backing layer. Such groups are for instance, diphenyl, 3.3'-dimethoxy-diphenyl, carbazole, azoxybenzene, diphenylurea, etc.

The substituted aldehydes as well as the heterocyclic bases or both may contain the atom grouping which imparts to the dye substantive character. For instance, the following components are serviceable: 4.4'-diphenyldialdehyde, 4.4'-azoxybenzalaniline, p.p'-diquinaldine, p.p'-bisbenzoxazole, p.p'-bis-benzthiazole, p-phenylquinaldine, p-phenylbenzoxazole, p-phenylbenzthiazole and p-chlorophenylquinaldine. As condensing agents which have proved to be suitable I enumerate: a mixture of alcohol with a few drops of piperidine, pyridine and acetic anhydride; other known condensing agents likewise may be suitable. The dyestuffs according to my invention have a pronounced substantive character and therefore, involve the advantage that they very well dye the binding agent of the anti-halation layers and filter layers and yet these layers are completely and permanently decolorized by the alkaline developer within a short time. This feature differentiates them advantageously from the substantive azo-dyestuffs already known for the manufacture of anti-halation layers and filter layers respectively, which can be decolorized only after the developing process in an additional step by means of special baths (containing sodium hydrosulfite).

The following dyestuffs are mentioned by way of example:

Example 1.—The yellow colored product of the following formula,

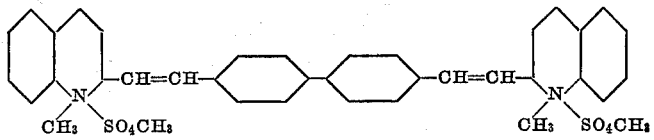

is obtained by boiling 2 molecular proportions of quinaldine methyl sulfate and 1 molecular proportion of 4.4'-diphenyldialdehyde in a quantity of pyridine sufficient for dissolution. The dye separates in form of small yellow crystals. It is filtered and washed with alcohol.

Example 2.—The condensation product from quinaldinedimethyl-sulfate and azo-hydroxybenzaniline in pyridine.

The yellow colored product of the following formula:

is obtained when working in the manner as described in Example 1 in form of yellow crystals.

Example 3.—The condensation product from bis-benzoxazole-dimethylsulfate and dimethylamidobenzaldehyde of the following formula

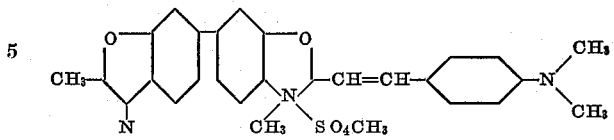

is obtained by boiling molecular proportions of bis-benzoxazoledimethylsulfate and dimethylamidobenzaldehyde in a quantity of acetic anhydride sufficient for dissolution for about ½ hour. After cooling, the dye separates. It forms red crystals.

Example 4.—The condensation product from p-phenylquinaldinedimethylsulfate and dimethylamidobenzaldehyde of the following formula:

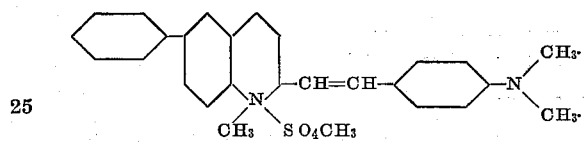

is obtained by boiling molecular proportions of p-phenylquinaldine dimethylsulfate and dimethyl amidobenzaldehyde a quantity of alcohol sufficient for dissolution and adding a small quantity of piperidine. The mixture is boiled for about 5 hours. The violet dye separates on cooling.

The condensation products mentioned in the foregoing examples are obtainable by dissolving the components to be condensed in the condensing agent and boiling the mixture. The dye which precipitates after cooling is separated by filtration and recrystallized from alcohol. The condensing agent which is best suited in each particular case and its most suitable amount can be easily determined by experiment.

My invention is not limited to the condensation products mentioned in the examples and I contemplate as included within my invention all such modifications and equivalents as fall within the scope of the appended claims. The preparation of the anti-halation layers or filter-layers may be carried out according to any known manner, for instance, that described in the above mentioned Patent 1,845,404. Instead of using gelatin as binding agent other colloids, for instance, calcium polyglycuronate or collodion may be used. Anti-halation layers and filter layers are regarded as being equivalents.

What I claim is:

1. A photographic material provided with an anti-halation layer comprising a backing including a basic styryl dye containing in its molecule an atom grouping which imparts substantive character to the dye with respect to the material of the backing.

2. A photographic material provided with an anti-halation layer comprising a styryl dye containing in its molecule an atom grouping selected from the group consisting of diphenyl, 3.3'-dimethoxydiphenyl, carbazole, azoxybenzene and diphenylurea.

3. A photographic material provided with an anti-halation layer containing the dye corresponding with the formula

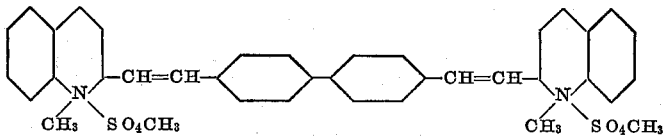

4. A photographic material provided with an anti-halation layer containing the dye corresponding with the formula

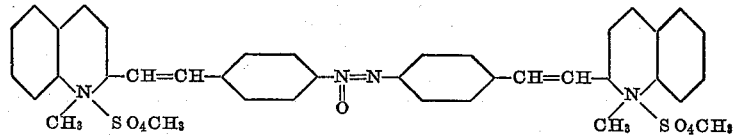

5. A photographic material provided with an anti-halation layer containing the dye corresponding with the formula

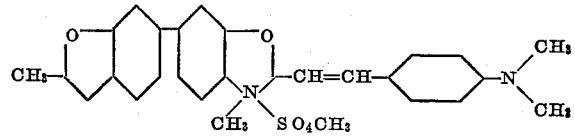

WILHELM SCHNEIDER.